Patented July 10, 1945

2,379,929

UNITED STATES PATENT OFFICE 2,379,929

SEPARATING PROTEIN FROM WASTE MATERIAL

Eugene R. Rushton, Florence, Ala., assignor to Tennessee Valley Authority, a corporation of the United States of America No Drawing. Application June 22, 1942, Serial No. 448,027

2 Claims. (Cl. 260—112)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the treatment of dilute wastes for the recovery of proteins therefrom.

Industrial wastes containing protein and usually diluted with large amounts of water are generally subjected to bacterial action in appropriate apparatus for the purpose of destroying putrescible substances therein. Chemical methods for the treatment of industrial wastes, such as sewage, have the advantage over the wet oxidation method in that less plant investment is required, but have the disadvantage of high cost of reagents and, in certain specific cases, the disadvantage of a certain proportion of the reagent used being retained in the waste after treatment, which may interfere with the subsequent removal of other constituents of the waste.

The principal object of this invention is to remove nitrogenous putrescible material from sewage and industrial wastes, particularly those derived in the processing of milk, without leaving objectionable reagents in the material after this particular treatment. Another object of this invention is to provide a process for the recovery of foodstuff from wastes which are otherwise edible, but are not useful in their present condition, due to the extreme dilution with water. A further object of this invention is to provide a process for the recovery of nitrogenous fertilizer material from industrial wastes from which it is not ordinarily recoverable by the methods of treatment usually employed. Still another object of this invention is to provide a method for the treatment of whey for the substantially complete removal of protein therefrom in order that milk sugar or lactic acid may be subsequently recovered therefrom. Other objects of this invention include the provision of a method for the removal of proteins from industrial wastes which utilizes very finely divided calcium metaphosphate which would otherwise have to be reprocessed to prepare it in a granular condition suitable for use for known applications such as distribution in the form of fertilizing material.

The present invention is directed to a process for the separation of protein from aqueous waste material containing proteins therein by mixing a finely divided solid soluble metaphosphate with said waste material, by digesting the material for a time sufficient to precipitate a substantial proportion of the protein therein as a protein-phosphate complex, and by separating the precipitated protein-phosphate complex therefrom.

In the manufacture of calcium metaphosphate, rock phosphate is contacted at high temperature with phosphorus pentoxide, and the melt produced granulated, crushed and classified. As a result of the latter operations, a certain proportion of finely divided calcium metaphosphate of the order of 300 mesh is produced. In view of the fact that granular materials are generally employed for distribution in the fertilization plants, it will be ordinarily necessary to either agglomerate or otherwise treat this finely divided material to prepare it in a suitable condition for this purpose. It has been found that this finely divided solid soluble calcium metaphosphate is suitable for the precipitation of a protein-phosphate complex from dilute aqueous solutions containing protein. Furthermore, such precipitation has also been produced by the use of finely divided soluble alkali metal metaphosphates.

Industrial wastes containing protein are generally either slightly acidic or develop acidity as oxidation thereof proceeds. The finely divided solid soluble metaphosphate is mixed with such industrial wastes, the mixture maintained in a slightly acid condition, generally of the order of a pH of 5, and the mixture digested for a time sufficient to precipitate a substantial proportion of the protein therein as a protein-phosphate complex. Although it appears theoretically that one gram of $P_2O_5$ in the form of metaphosphate will precipitate approximately twenty grams of protein, the results which have been obtained so far, using the very dilute protein-containing waste solutions, indicate that the amount of $P_2O_5$ as metaphosphate required is of the order of 0.25 to 0.5 gram per gram of protein precipitated as the protein-phosphate complex. This is accounted for, in part, by the fact that, although the finely divided solid metaphosphate, particularly calcium metaphosphate, is soluble, it is only slightly dissolved in the waste under treatment and that, during the time required for this treatment, only a part of the metaphosphate is actually dissolved and serves as a precipitant for the production of the protein-phosphate complex.

The precipitated protein-phosphate complex produced from the reaction of finely divided solid soluble metaphosphate with protein-containing industrial waste material contains of the order of 5% $P_2O_5$ and 16% nitrogen. If this material is produced from raw material which is edible except for the fact that it is too dilute for direct utilization, the protein-phosphate complex precipitated therefrom is suitable for use as a foodstuff, particularly for livestock. If the original material is inedible, such as sewage which is to be subjected to treatment, the protein-phosphate complex is of such a character that it may be utilized as a fertilizer for its nitrogen and phosphorus content, or utilized in fertilizer compositions for the purpose of conditioning the same. Where a substantial excess of the finely divided soluble solid calcium metaphosphate over that immediately required to precipitate the protein exists, the resulting precipitate associated with the unreacted metaphosphate may be separated from the treated waste material, and after drying, utilized either as a foodstuff or as a fertilizer, depending upon the character of the original waste material.

The method of the present invention provides a procedure whereby industrial wastes containing proteins, as ordinarily derived from packing plants, breweries, distilleries, starch plants, dairies, creameries and cheese factories, may be treated to remove the protein therefrom and produce new compositions of either the protein-phosphate complex, or this complex intimately associated with finely divided solid metaphosphate such as that used in the treatment to remove the protein.

It will be seen, therefore, that this invention actually may be carried out by the use of various modifications and changes without departing from its spirit and scope.

I claim:

1. A process for the separation of protein from aqueous waste material containing proteins therein, which comprises (a) mixing a finely divided solid calcium metaphosphate with said waste material, (b) digesting the material for a time sufficient to precipitate a substantial proportion of the protein therein as a protein-phosphate complex, and (c) separating the precipitated protein-phosphate complex therefrom.

2. A process for separating protein from aqueous industrial waste material containing proteins therein, which comprises (a) mixing a finely divided solid calcium metaphosphate with said waste material, (b) maintaining the mixture in a slightly acid condition, (c) digesting the mixture for a time sufficient to precipitate a substantial proportion of the protein therein as a protein-phosphate complex, and (d) separating the precipitated protein-phosphate complex therefrom.

EUGENE R. RUSHTON.